Nov. 16, 1971   A. H. MACKENZIE   3,619,827
LIGHTWEIGHT DETACHABLE TENT-COT MEANS
Filed Oct. 2, 1970   4 Sheets-Sheet 1
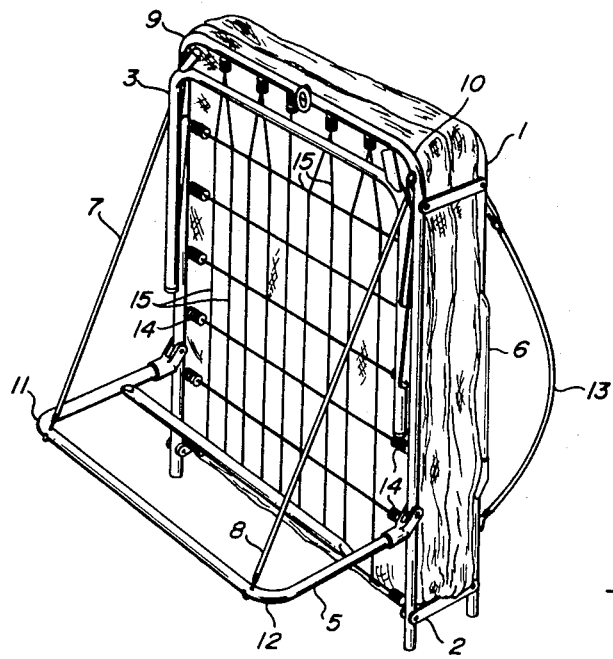
INVENTOR.
ALBERT H. MACKENZIE
BY
*James H. Phillips*
ATTORNEY

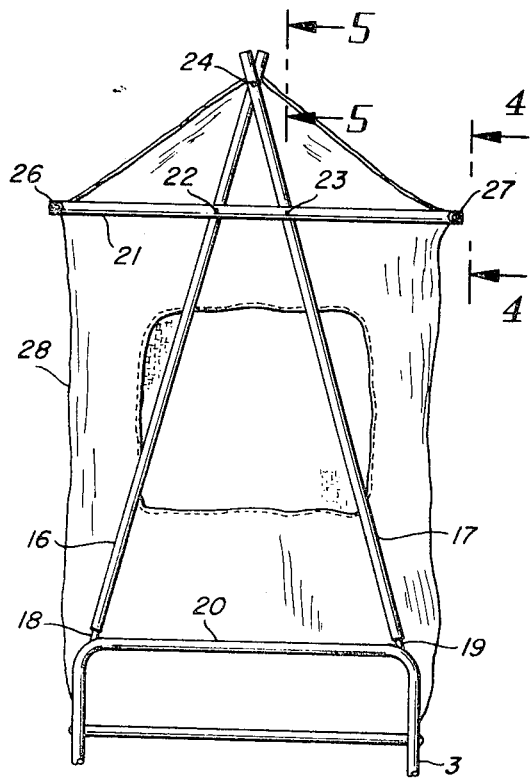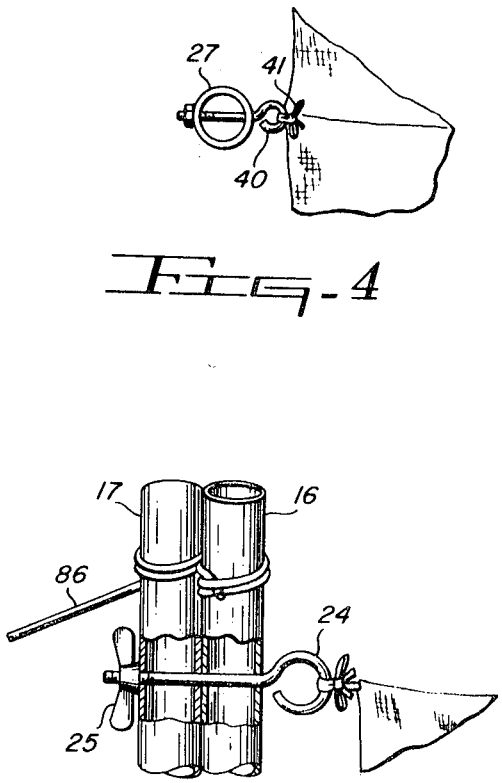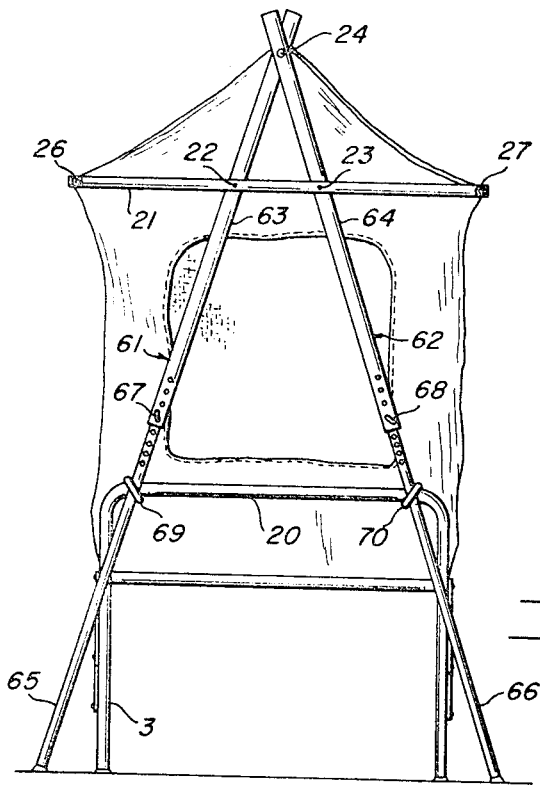

Nov. 16, 1971 A. H. MACKENZIE 3,619,827
LIGHTWEIGHT DETACHABLE TENT-COT MEANS
Filed Oct. 2, 1970 4 Sheets-Sheet 3

INVENTOR.
ALBERT H. MACKENZIE
BY
James H. Phillips
ATTORNEY

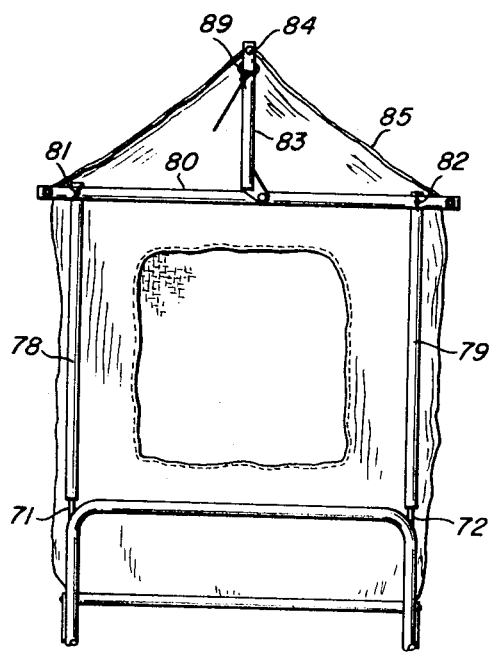
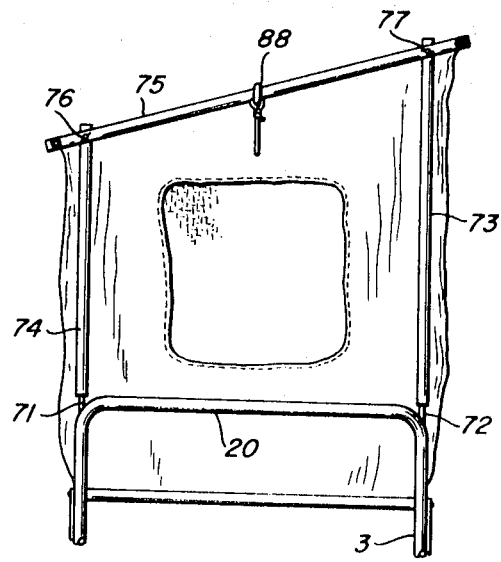
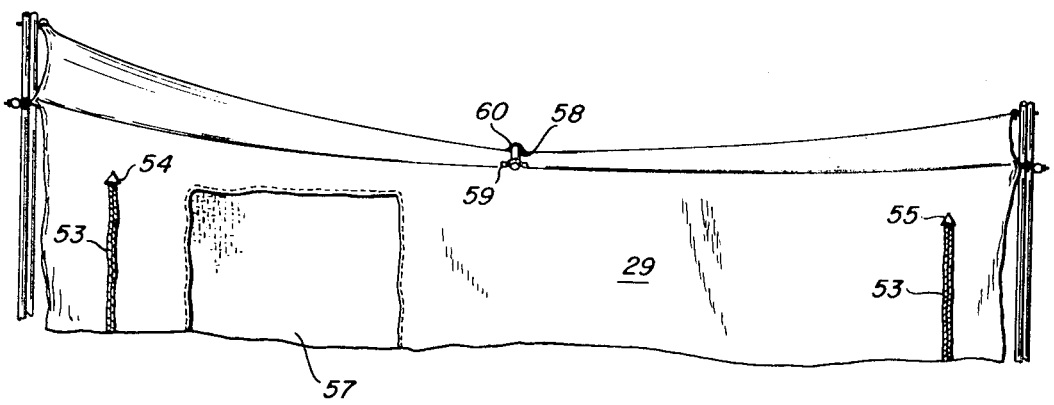

United States Patent Office 3,619,827
Patented Nov. 16, 1971

3,619,827
LIGHTWEIGHT DETACHABLE TENT-COT MEANS
Albert H. Mackenzie, 1632 E. Claremont St.,
Phoenix, Ariz. 85016
Filed Oct. 2, 1970, Ser. No. 77,602
Int. Cl. A45f *1/00, 3/00*
U.S. Cl. 5—113                                          12 Claims

ABSTRACT OF THE DISCLOSURE

While sleeping out in difficult terrain, a tent-cot combination is provided which is sufficiently compact for ready transport upon the user's back while nonetheless providing complete protection when erected. A lightweight cot frame is provided at each end with studs or equivalent means for supporting tubular end frame structure in an upright position. A fully enclosed tent is supported off the ground by the cot frame and is held upright between the end frame structures at the head and foot ends of the assembly. Three basic embodiments disclosed use diverse end frame structures; viz: a modified A-frame, a trapezoid frame, and a straight pentagonal frame. All the embodiments disclosed fold into a compact unit for carrying by articulating the head and foot ends of the cot frame inwardly to form a "sandwich" unit with the tent proper disposed within the cot frame. An attachment to one of the cot frame leg means permits it to be disposed horizontally outwardly to function as a carrying platform for additional supplies.

---

This invention relates to the portable tent arts and, more particularly, to an improved tent-cot combination.

Campers, hikers, hunters, and others who are required to sleep out doors in difficult terrain usually carry a sleeping bag which is simply unrolled on the ground at a favorable position. Such a sleeping bag offers only minimal protection against inclement weather, wet grounds, insects, snakes, rodents, etc. For that reason, tent-cot combinations have been proposed in the past to afford both comfort and protection to the user in difficult terrain. However, the prior art tent-cots have been cumbersome and completely impractical for transport over substantial distances. Thus, it will be understood that it would be highly desirable to provide a practical tent-cot combination embodying the basic advantages of such a combination in practical form.

It is therefore a broad object of this invention to provide an improved tent-cot combination.

It is a more specific object of this invention to provide a lightweight tent-cot combination which may be folded and carried as a unit on the user's back.

It is an ancillary object of this invention to provide such a tent-cot combination which incorporates a carrying rack for additional equipment.

It is a still more specific object of this invention to provide such a tent-cot combination utilizing three variant tent end structures each of which is both sturdy and simple in nature.

The manner in which these and other objects of the invention are realized will become more readily apparent to those conversant in the art through a perusal of the following specification, taken in conjunction with the claims subjoined and the figures of which:

FIG. 1 is a perspective view of the tent-cot comprising the present invention completely folded and ready for back pack;

FIG. 2 is a perspective view of a first preferred embodiment of the present invention completely set up for occupancy;

FIG. 3 is a head end view of the embodiment of the invention depicted in FIG. 2;

FIG. 4 is a fragmentary view taken at the line 4—4 of FIG. 3;

FIG. 5 is a partially cut-away fragmentary view taken at the line 5—5 of FIG. 3;

FIG. 6 is a fragmentary partially cut-away view of a detail of the embodiment of the invention illustrated in FIGS. 2 and 3;

FIG. 7 is an end view illustrating a variant of the first preferred embodiment of the invention;

FIG. 15 is a side view of the upper section of the tent portion of the first preferred embodiment of the invention;

FIG. 16 is an end view of a second preferred embodiment of the invention;

FIG. 17 is an end view of a third preferred embodiment of the invention;

Figure 8:
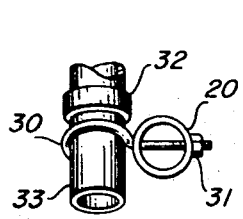
FIG. 8 is a fragmentary view illustrating a detail of a variant to the first preferred embodiment of the invention.

Referring now to FIG. 1, the tent-cot combination of the present invention is shown in folded form ready for transport upon the user's back. While several presently preferred embodiments of the invention will be discussed below, it will be understood that each of them can be folded into the general configuration illustrated in FIG. 1. Referring simultaneously to FIG. 1 and to FIG. 2, which illustrate a first preferred embodiment of the invention, it will be obvious that the cot section includes a cot frame 1 which is articulated at its lengthwise midpoint by means of hinges 2 such that the entire unit can be folded as shown in FIG. 1 or extended as shown in FIG. 2. Pivotally secured to the cot frame 1 are first and second leg means, 3 and 4, disposed respectively at the head and foot ends of the tent-cot. Third and fourth leg means 5 and 6 are pivotally secured to the cot frame 1 respectively to the head side and foot side of the line of articulation in the cot frame 1 to provide intermediate support when extended for use.

As shown in FIG. 1, the third leg means 5 may be suspended in the horizontal position by the utilization of nylon cords 7 and 8 which extend between corners 9 and 10 of the cot frame 1 and the corners 11 and 12 of the third leg means 5. The platform resulting can be beneficially utilized to pack additional equipment and supplies in accordance with the strength and endurance of the user. A shoulder strap 13 and a corresponding shoulder strap, not visible in FIG. 1, are utilized in the obvious fashion to suspend the unit on the back of the user. The cot frame 1 may be provided with conventional interlaced spring 14 and wire 15 suspension or the equally conventional canvas suspension according to the needs of the user.

As shown in the perspective view of FIG. 2 and the end view of FIG. 3, the end frames which provide longitudinal support to the tent proper comprise first and second diagonal tubular frame members 16 and 17 secured together at the apex of the tent and diverging symmetrically downwardly for slipping onto generally upwardly extending studs 18 and 19 which are welded to the outboard ends of horizontal portions 20 of the first and second leg means 3 and 4. The manner in which the diagonal frame members fit over the studs is best shown in FIG. 6 which is a partially cut-away detail of the junction of the frame member 17 with the stud 19. A horizontal third tubular frame member 21 is secured by pins 22 and 23 to the first and second tubular members 16 and 17 in a position somewhat nearer the upper ends to effect a modified A configuration. As best shown in FIG. 5, the frame members 16 and 17 are skewered together near their upper ends by means of an eye pin 24 extending through aligned holes and fixed with a wing nut 25. The outboard ends 26 and 27 of the horizontal tubular frame member 21 are drilled to provide any convenient means for fixing the adjacent junctions of the top, end, and sides of the tent proper to the end frame. For example, as shown in FIG. 4, an eye bolt 40 may be provided to which the junction ties 41 may be tied, or the ties 41 may be simply knotted in place.

As best shown in the prespective view of FIG. 2, the foot end of the tent portion of the combination unit is smaller than the head end, and it will be understood that the end frame at the foot end, not shown, has the same general shape as the end frame at the head end although it has somewhat smaller dimensions. Similarly, the tent end piece 28 at the head end of the tent has a corresponding, but smaller end piece, not shown, at the foot end. The access side 29, the side out of view, the tent top 30, and the tent bottom, out of view, all taper to appropriately join the tent end pieces.

Several practical variations in the apparatus for securing the diagonal tubular frame members 16 and 17 to the leg means 3 are illustrated in FIGS. 8–14. For example, as shown in FIG. 8, the horizontal portion 20 of the leg means 3 may be drilled to receive an eye bolt 30 secured by a nut 31. The appropriate diagonal tubular frame member, for example a frame member 33, corresponding to the frame member 17, is provided with a collar 32 which functions as a stop. In operation, the diagonal frame member is inserted through the eye bolt until the collar 32 is seated.

Figure 11:
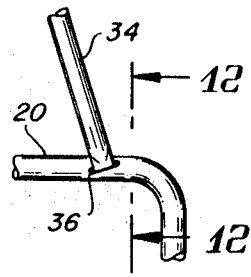
FIG. 11 is a fragmentary view illustrating a detail of a third variant to the first preferred embodiment of the invention.
Figure 12:
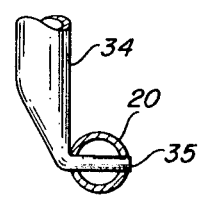
FIG. 12 is a partial cross-sectional view taken along the line 12—12 of FIG. 11.
Figure 13:
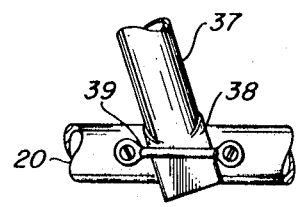
FIG. 13 is a fragmentary view illustrating a detail of a fourth variant to the first preferred embodiment of the invention.

FIGS. 11 and 12 illustrate a variant in which the lower end of frame member 34, which also corresponds to the frame member 17, has a flattened portion 35 beneath at a right angle for insertion into a diagonal slot 36 opening through the horizontal portion 20 of the leg means 3. A similar variation is shown in FIG. 13 where a frame member 37, corresponding to the frame member 17, has a straight, flattened lower end portion 38 for insertion into a loop 39 screwed, riveted, or otherwise affixed to the horizontal portion 20 of the leg means 3.

Figure 9:
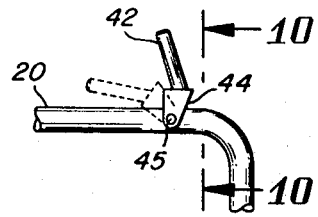
FIG. 9 is a fragmentary view illustrating a detail of a second variant to the first preferred embodiment of the invention.
Figure 10:
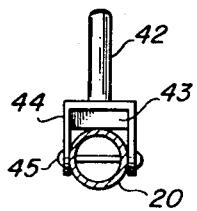
FIG. 10 is a partial cross-sectional view taken along the line 10—10 of FIG. 9.

The variant illustrated in FIGS. 9 and 10 provides upwardly directed studs 42 pivotally secured to the horizontal portion 20 of the leg means 3 to provide a folded down portion adjacent the horizontal portion 20 and an extended portion for receiving and supporting the tubular frame members such as the frame member 17. The angle at which the stud 42 obtains when in the extended position is governed by a stop portion 42 of a bracket 44 which straddles the horizontal portion 20. A rivet 45 secures the bracket 44 pivotally in place as best shown in FIG. 10.

Figure 14:
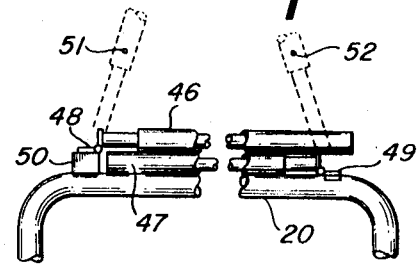
FIG. 14 is a fragmentary, partially cut-away end view illustrating a variant of the first embodiment of the invention in which certain elements of the tent end frame are permanently pivotally secured to the cot portion.

In the configuration shown in FIG. 14, telescoping frame members 46 and 47, which correspond to the frame members 16 and 17, are permanently affixed to the horizontal portion 20 of the leg means 3 by hinges 48 and 49, respectively. It will be observed in FIG. 14 that the hinge 43 is secured to a pedestal 50 in order that the frame members 46 and 47 will fold into overlaying positions. The frame members 46 and 47 have a telescoping construction in order to reduce and lengthen when folded. When extended, the outer tubes are drawn upwardly and secured to the inner tubes by means of pins 51 and 52. The upper ends of the telescoping tubular frame members 46 and 47 may be skewered together in the manner of the frame members 16 and 17 as shown in FIGS. 2, 3, and 5. FIG. 7 illustrates a variant which is an extension of that discussed in conjunction with FIG. 8.

Referring now to FIGS. 2 and 15, the tent proper of the first preferred embodiment is described in further detail. As noted above, the head end piece 28 and the foot end piece (not visible) have the same general geometric shape although the foot end piece is somewhat smaller such that the top 30, access side 29, the side out of view and the bottom pieces of the tent proper all taper toward the foot end. The access side 29 of the tent includes a zipper 53 extending downwardly from a first terminal 54 near the top of the head end of the access side 29, rearwardly near the bottom of the side piece 29 to the foot end and upwardly to a second terminal 55 near the top of the foot end of the side piece 29. When partially or fully unzipped, easy access is provided to the interior of the compartment. Integrated into the head end piece 28 and into the access wall 29 near the head end, as well as in the tent wall not visible, are screened ports 56 and 57. Each port is backed by canvas or by all but transparent plastic rain proof windows operated by zippers, snaps, or other convenient means.

Still referring to FIGS. 2 and 15, it will be observed that a tube 58 is disposed transversely across the top 30 near the midpoint of the length of the tent. Each end of the tube 58 is anchored to the tent eaves by small straps of webbing 59 sewed to the eaves. The tube 58 also passes through a ring 60 affixed to the ridge line to hold up the ridge line. It has been found that the provision of the tube 58, which can be left permanently in place, virtually eliminates all sagging in the top 30 thus significantly improving the drainage therefrom. Without the tube 58, the tent top, 30 has an annoying tendency to form troughs and puddles.

A more significant departure from the basic first preferred embodiment is shown in FIG. 7. Telescoping diagonal tubular frame members 61 and 62 each comprise a large diameter upper portion 63 and 64 and a small diameter lower portion 65 and 66. The large and small diameter portions of the frame members 61 and 62 are pinned together through aligned holes by the pins 67 and 68. The lower portions 65 and 66 pass, respectively, through rings 69 and 70 which are secured to the horizontal portion 20 of the leg means 3 in the same manner as the eye bolt 30 depicted in FIG. 8. However, as will be apparent from FIG. 7, the lower frame member portions 65 and 66 extend all the way to the ground such that the weight of the end frame assembly is placed directly thereon rather than on the leg means 3.

FIG. 16 is an end view of a second preferred embodiment of the invention in which the end frames are generally trapezoidal. Upwardly directed studs 71 and 72, corresponding to the studs 18 and 19 depicted in FIGS. 3 and 6, are disposed at each end of the horizontal portion 20 of the leg means 3. A long upright tubular frame member 73 is introduced over the stud 72 and a somewhat shorter tubular frame member 74 is introduced over the stud 71 such that both are vertically free standing. An upper tubular frame member 75 is fixed to the longer vertical tubular frame member 73 by a rivet 77 sufficiently loose to permit ready pivoting of the joint or by equivalent means and to the shorter vertical tubular frame member 74 by means of a bolt and wing nut 76 to implement assembly and disassembly. When disassembled, the tubular frame member 75 pivots down alongside the frame member 73 for folding. It will be obvious that there is no need for internal bracing between the tubular frame members 73, 74, and 75 because of the inherent rigidity of the end frame assembly. An end view of FIG. 16 is of the head end of the tent. It will be understood that the foot end has a similar geometric shape but of smaller dimensions such that the top, bottom, and sides of the tent proper all taper from the head end to the foot end.

A third preferred embodiment of the invention is shown in FIG. 17 having a different end frame structure for use with the same cot structure incorporated into the second preferred embodiment illustrated in FIG. 16. Referring to FIG. 17, vertically oriented, equal length tubular frame members 78 and 79 fit respectively over the studs 71 and 72. A third frame member 80 extends between upper ends of the frame members 78 and 79 and is affixed thereto by means of a bolt and wing nut assembly 81 and 82, alternatively, the horizontal frame member 80 may be loosely riveted to either of the vertical frame members 78, 79 with the bolt and wing nut assembly used on only one end to facilitate assembly and disassembly.

Intermediate along the length of the horizontal frame member 80 is a fifth tubular frame member 83 which is pivotally secured to the horizontal frame member 80 whereby it can be folded against the horizontal frame member when the unit is collapsed or swung upwardly into the assembled portion shown in FIG. 17 in which it is vertically disposed substantially half way between the vertical frame members 78 and 79 to support the apex 84 of the tent top 85. The end frame structure of the third preferred embodiment is suggestive of a straight pentagonal geometric shape and, similarly to the second preferred embodiment of FIG. 16, no internal bracing is required to prevent movement within the plane of the end frame. Additionally, like the first and second embodiments, the structure at the foot end is smaller than the structure at the head end, and the various pieces of the tent are dimensioned and shaped accordingly.

To provide the greatest amount of longitudinal stability, conventional tie downs such as the tie downs 86 and 87 of FIG. 2, may be used with all three preferred embodiments. The tent end of the tie downs in the first embodiment may simply be lapped around the diagonal tubular frame members 16 and 17 as best shown in FIG. 5 or in any equivalent fashion. The second embodiment, illustrated in FIG. 16, utilizes an eye bolt 88 fixed to the tubular frame member 75 midway along its length. A similar bolt or ring 89 may be incorporated into the straight pentagonal embodiment of FIG. 17.

Figure 18:
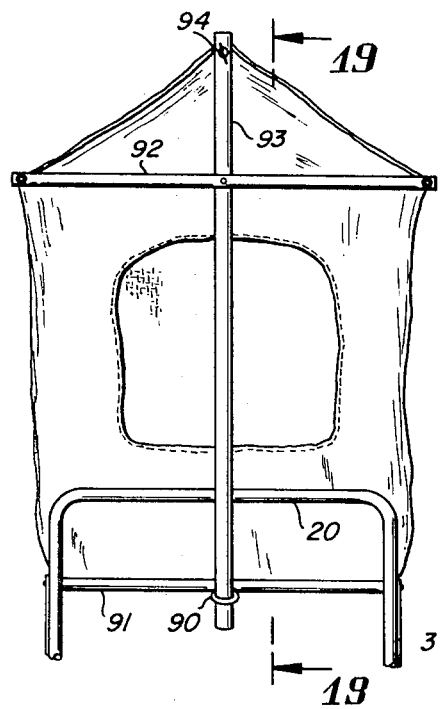
FIG. 18 is an end view of a fourth preferred embodiment of the invention.
Figure 19:
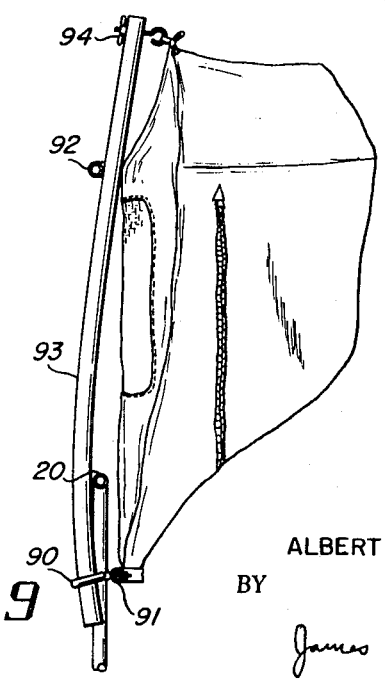
FIG. 19 is a fragmentary view taken along the line 19—19 of FIG. 18.

FIGS. 18 and 19 depict an embodiment of the invention in which the longitudinal tie downs may be dispensed with. A sturdy ring 90 is fixed to a lower horizontal cross piece 91 of the leg means 3. The same tent structure is utilized as was used with the first embodiment (FIG. 2) and the third embodiment (FIG. 17), and a single horizontal tubular frame member 92 stretches from eave to eave of the tent supporting the corners as shown in FIG. 4. A resilient vertical tubular frame member 93 extends through the ring 90, outboard of the horizontal portion 20 of the leg means 3, and inboard of the horizontal frame member 92. As a result of using this configuration, the tent ends are spring loaded outwardly according to the elastic properties of the vertical frame member 93. It has been found that this simple end frame arrangement will withstand even moderately severe winds without seriously affecting the stability of the tent. The apex of the tent is supported by an eye bolt and wing nut 94 in a manner similar to that shown in FIG. 5 although only the single tubular frame member 93 is pierced.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:
1. A lightweight tent-cot combination unit comprising:
 (a) a cot, said cot including:
  (1) a rectangular cot frame, said cot frame being articulated midway along the length thereof;
  (2) first, second, third and fourth folding leg means, said first and second leg means being disposed respectively at head and foot ends of said cot frame and said third and fourth leg means being disposed intermediate along the length of said cot;
  (3) each of said leg means having a first, folded position and a second, extended position; each of said leg means in said folded position laying adjacent said cot frame, and each of said leg means in said extended position extending downwardly and substantially normal to said cot frame such that said cot frame is supported in spaced apart relationship to the terrain;
  (4) each of said first and second leg means including a pair of spaced apart generally upwardly projecting stud members; and
 (b) a tent detachably secured to said cot, said tent having a head end and a foot end and including:
  (1) first and second end frames, said first end frame being disposed at the head end of said tent and said second end frame being disposed at the foot end of said cot, said first end frame having a greater height than said second end frame, said first and second end frames being generally of the same geometric configuration;
  (2) each of said first and second end frames including first and second tubular frame members, said first and second frame members being generally downwardly directed and having an inside diameter greater than the outside diameter of said stud members such that the lower ends of each of said first and second frame members of each said end frame fit onto one of said stud members to support said end frames in a vertical position;
  (3) third tubular frame members included in each of said first and second end frames, said third frame members each extending between and supported by said first and second tubular frame members of the corresponding end frame, each of said third tubular frame members being disposed proximate the upper terminus of the corresponding one of said end frames of which it is a constituent; and
  (4) a completely enclosed compartment of readily foldable material, said compartment having a head end and a foot end, said head and foot ends having generally the same geometrical shape, said foot end being smaller than said head end; said compartment including first and second sides, a bottom, and a top, all said sides, bottom, and top tapered between said head end and said foot end of said tent, said compartment means being supported at said head end by said head end frame and at said foot end by said foot end frame, said compartment bottom overlaying said cot frame when said tent-cot combination is set up for use.

2. The tent-cot combination unit of claim 1 in which said first and second end frames have a generally A shaped configuration, said first and second tubular frame members of each said end frame being pinned together at their apex and diverging diagonally to said stud members, each of said third tubular frame members crossing the corresponding said first and second tubular frame members and extending symmetrically outwardly, said third frame members each including means proximate each end for supporting four junction points between said ends, sides, and top of said compartment.

3. The tent-cot combination of claim 1 in which said first and second end frames, in conjunction respectively with an upper, horizontally extending end rail portion of said first and second leg means, have a generally trapezoid shaped configuration, said first and second tubular frame members of each of said first and second end frames extending vertically upwardly from said upwardly projecting stud members, said first frame member of each of said first and second end frames being longer than said second frame member of the corresponding end frame, said third tubular frame member extending between the upper ends of said first and second tubular frame members and slightly outwardly beyond said first and second frame members, said third frame member including means proximate each end for supporting four junction points between said ends, sides, and top of said compartment.

4. The tent-cot combination of claim 1 in which said first and second frames, in conjunction with an upper, horizontally extending portion of said first and second leg means respectively, have a generally rectangular shaped configuration, said first and second tubular frame members of each of said first and second end frames extending vertically upwardly from said upwardly directed stud members, said third tubular frame member being horizontally disposed between the upper ends of said first and second tubular frame members and slightly outwardly beyond said first and second frame members, said third frame member including means proximate each end for supporting four junction points between said ends, sides, and top of said compartment; and a fourth tubular frame member pivotally secured to said third frame member intermediate along its length, said fourth frame member having a folded position parallel to and adjacent said third frame member and an extended position normal to and extending upwardly from said third frame member and parallel to said first and second frame members, and means at the upper terminus of said fourth frame member supporting said top of said compartment at an apex point whereby said head end and said foot end of said compartment assumes a pentagonal configuration.

5. A lightweight tent-cot combination unit comprising:
(a) a cot, said cot including:
   (1) a rectangular cot frame, said cot frame being articulated midway along the length thereof;
   (2) first, second, third and fourth folding leg means, said first and second leg means being disposed respectively at head and foot ends of said cot frame and said third and fourth leg means being disposed intermediate along the length of said cot;
   (3) each of said leg means having a first, folded position and a second, extended position; each of said leg means in said folded position laying adjacent said cot frame, and each of said leg means in said extended position extending downwardly and substantially normal to said cot frame such that said cot frame is supported in spaced apart relationship to the terrain;
   (4) each of said first and second leg means including an upper, horizontally extending portion and a pair of spaced apart stud members pivotally secured thereto, each of said stud members having a folded position parallel to and adjacent the corresponding one of said horizontally extending portions of said leg means and a generally upwardly projecting extended position; and (b) a tent detachably secured to said cot, said tent having a head end and a foot end and including:
   (1) first and second end frames, said first end frame being disposed at the head end of said tent and said second end frame being disposed at the foot end of said cot, said first end frame having a greater height than said second end frame, said first and second end frames being generally of the same geometric configuration;
   (2) each of said first and second end frames including first and second tubular frame members, said first and second frame members being generally downwardly directed and having an inside diameter greater than the outside diameter of said stud members such that the lower ends of each of said first and second frame members of each said end frame fit onto one of said stud members to support said end frames in a vertical position;
   (3) third tubular frame members included in each of said first and second end frames, said third frame members each extending between and supported by said first and second tubular frame members of the corresponding end frame, each of said third tubular frame members being disposed proximate the upper terminus of the corresponding one of said end frames of which it is a constituent; and
   (4) a completely enclosed compartment of readily foldable material, said compartment having a head end and a foot end, said head and foot ends having generally the same geometrical shape, and foot end being smaller than said head end; said compartment including first and second sides, a bottom, and a top, all said sides, bottom, and top tapered between said head end and said foot end of said tent, said compartment means being supported at said head end by said head end frame and at said foot end by said foot end frame, said compartment bottom overlaying said cot frame when said tent-cot combination is set up for use.

6. The tent-cot combination unit of claim 5 in which said first and second end frames have a generally A shaped configuration, said first and second tubular frame members of each said end frame being pinned together at their apex and diverging diagonally to said stud members, each of said third tubular frame members crossing the corresponding said first and second tubular frame members and extending symmetrically outwardly, said third frame members each including means proximate each end for supporting four junction points between said ends, sides, and top of said compartment.

7. The tent-cot combination of claim 5 in which said first and second end frames, in conjunction respectively with an upper, horizontally extending end rail portion of said first and second leg means, have a generally trapezoid shaped configuration, said first and second tubular frame members of each of said first and second end frames extending vertically upwardly from said upwardly projecting stud members, said first frame member of each of said first and second end frames being longer than said second frame member of the corresponding end frame, said third tubular frame member extending between the upper ends of said first and second tubular frame members and slightly outwardly beyond said first and second frame members, said third frame member including means proximate each end for supporting four junctions points between said ends, sides, and top of said compartment.

8. The tent-cot combination of claim 5 in which said first and second frames, in conjunction with an upper, horizontally extending portion of said first and second leg means respectively, have a generally rectangular shaped configuration, said first and second tubular frame members of each of said first and second end frames extending vertically upwardly from said upwardly directed stud members, said third tubular frame member being horizontally disposed between the upper ends of said first and second tubular frame members and slightly outwardly beyond said first and second frame members, said third frame member including means proximate each end for supporting four junction points between said ends, sides, and top of said compartment; and a fourth tubular frame member pivotally secured to said third frame member intermediate along its length, said fourth frame member having a folded position parallel to and adjacent said third frame member and an extended position normal to and extending upwardly from said third frame member and parallel to said first and second frame members, and means at the upper terminus of said fourth frame member supporting said top of said compartment at an apex point whereby said head end and said foot end of said compartment assumes a pentagonal configuration.

9. A lightweight tent-cot combination unit comprising:
(a) a cot, said cot including
(1) a rectangular cot frame, said cot frame being articulated midway along the length thereof;
(2) first, second, third and fourth folding leg means, said first and second leg means being disposed respectively at head and foot ends of said cot frame and said third and fourth leg means being disposed intermediate along the length of said cot;
(3) each of said leg means having a first folded position and a second, extended position; each of said leg means in said folded position laying adjacent said cot frame, and each of said leg means in said extended position extending downwardly and substantially normal to said cot frame such that said cot frame is supported in spaced apart relationship to the terrain;
(4) each of said first and second leg means including an upper, horizontally extending portion;
(5) first and second tubular frame members pivotally secured at one end thereof to each one of said leg means at spaced positions, each of said first and second tubular members having a folded position parallel to and adjacent said horizontally extended position of the corresponding one of said leg means and a generally upwardly extending second position; and
(b) a tent detachably secured to said cot, said tent having a head end and a foot end and including:
(1) first and second end frames, said first end frame being disposed at the head end of said tent and said second end frame being disposed at the foot end of said cot, said first end frame having a greater height than said second end frame, said first and second end frames being generally of the same geometric configuration;
(2) each of said first and second end frames including said first and second tubular frame members;
(3) third tubular frame members included in each of said first and second end frames, said third frame members each extending between and supported by said first and second tubular frame members of the corresponding end frame, each of said third tubular frame members being disposed proximate the upper terminus of the corresponding one of said end frames of which it is a constituent; and
(4) a completely enclosed compartment of readily foldable material, said compartment having a head end and a foot end, said head and foot ends having generally the same geometrical shape, said foot end being smaller than said head end; said compartment including first and second sides, a bottom, and top being tapered between said head end and said foot end of said tent, said compartment being supported at said head end by said head end frame and at said foot end by said foot end frame, said compartment bottom overlaying said cot frame when said tent-cot combination is set up or use.

10. A light weight tent-cot combination unit comprising:
(a) a cot, said cot including
(1) a rectangular cot frame, said cot frame being articulated midway along the length thereof;
(2) first, second, third and fourth folding leg means, said first and second leg means being disposed respectively at head and foot ends of said cot frame and said third and fourth leg means being disposed intermediate along the length of said cot;
(3) each of said leg means having a first folded position and a second, extended position; each of said leg means in said folded position laying adjacent said cot frame, and each of said leg means in said extended position extending downwardly and substantially normal to said cot frame such that said cot frame is supported in spaced apart relationship to the terrain;
(4) each of said first and second leg means including a pair of spaced apart ring members; and
(b) a tent detachably secured to said cot, said tent having a head end and a foot end and including:
(1) first and second end frames, said first end frame being disposed at the head end of said tent and said second end frame being disposed at the foot end of said cot, said first end frame having a greater height than said second end frame, said first and second end frames being generally of the same geometric configuration;
(2) each of said first and second end frames including first and second telescoping tubular frame members, said first and second frame members being generally downwardly directed and having at least a portion with an outside diameter smaller than the inside diameter of said ring members such that the lower ends of each of said first and second frame members of each said end frame pass through one of said ring members to rest upon the terrain whereby said end frames are supported in a vertical position;
(3) third tubular frame members included in each of said first and second end frames, said third frame members each extending between and supported by said first and second tubular frame members of the corresponding end frame, each of said third tubular frame members being disposed proximate the upper terminus of the corresponding one of said end frames of which it is a constituent; and
(4) a completely enclosed compartment of readily foldable material, said compartment having a head end and a foot end, said head and foot ends having generally the same geometrical shape, said foot end being smaller than said head end; said compartment including first and second sides, a bottom, and a top, all said sides, bottom, and top tapered between said head end and said foot end of said tent, said compartment means being supported at said head end by said head end frame and at said foot end by said foot end frame, said compartment bottom overlaying said cot frame when said tent-cot combination is set up for use.

11. A lightweight tent-cot combination unit comprising:
(a) a cot, said cot including
  (1) a rectangular cot frame, said cot frame being articulated midway along the length thereof;
  (2) first, second, third and fourth folding leg means, said first and second leg means being disposed respectively at head and foot ends of said cot frame and said third and fourth leg means being disposed intermediate along the length of said cot;
  (3) each of said leg means having a first, folded position and a second, extended position; each of said leg means in said folded position laying adjacent said cot frame, and each of said leg means in said extended position extending downwardly and substantially normal to said cot frame such that said cot frame is supported in spaced apart relationship to the terrain;
  (4) each of said first and second leg means including a horizontal cross piece and a ring member affixed thereto midway along the length thereof, each of said first and second leg means further including a horizontal upper connecting portion;
(b) a tent detachably secured to said cot, said tent having a head end and a foot end and including:
  (1) first and second end frames, said first end frame being disposed at the head end of said tent and said second end frame being disposed at the foot end of said cot, said first end frame having a greater height than said second end frame, said first and second end frames being generally of the same geometric configuration;
  (2) each of said first and second end frames including a single vertically oriented tubular frame member and a single horizontally oriented tubular frame member joined in an upright T arrangement, the outer diameter of said vertical frame member being smaller than the inner diameter of said ring member;
  (3) a completely enclosed compartment of readily foldable material, said compartment having a head end and a foot end, said head and foot ends having generally the same geometrical shape, said foot end being smaller than said head end; said compartment including first and second sides, a bottom, and a top, all said sides, bottom, and top tapered between said head end and said foot end of said tent, said compartment means being supported at said head end by said head end frame and at said foot end by said foot end frame, said compartment bottom overlaying said cot frame when said tent-cot combination is set up for use;
  (4) said vertical frame member having its lower end pass through said ring member and intermediate portions passing outboard said horizontal upper connecting portion and inboard said horizontal frame member such that each of said horizontal frame members included in said end frames are sprung outwardly by the corresponding one of said vertical frame members.

12. A lightweight tent-cot combination unit comprising:
(a) a cot including a rectangular cot frame, said cot frame being articulated midway along the length thereof;
(b) first, second, third and fourth folding leg means, said first and second leg means being disposed respectively at head and foot ends of said cot frame and said third and fourth leg means being disposed intermediate along the length of said cot;
(c) each of said leg means having a first, folded position and a second, extended position; each of said leg means in said folded position laying adjacent said cot frame, and each of said leg means in said extended position extending downwardly and substantially normal to said cot frame such that said cot frame is supported in spaced apart relationship to the terrain;
(d) a tent including first and second end frames, said first end frame being disposed at the head end of said tent and said second end frame being disposed at the foot end of said cot, said first end frame having a greater height than said second end frame, said first and second end frames being generally of the same geometric configuration;
(e) a completely enclosed compartment of readily foldable material, said compartment having a head end and a foot end, said head and foot ends having generally the same geometrical shape, said foot end being smaller than said head end; said compartment including first and second sides, a bottom, and a top, all said sides, bottom, and top tapered between said head end and said foot end of said tent, said compartment means being supported at said head end by said head end frame and at said foot end by said foot end frame, said compartment bottom overlaying said cot frame when said tent-cot combination is set up for use; and
(f) means for detachably coupling said tent to said cot.

References Cited

UNITED STATES PATENTS

| | | | |
|---|---|---|---|
| 46,195 | 1/1865 | Weber | 224—10 |
| 626,010 | 5/1899 | Seely | 5—113 |
| 2,210,342 | 8/1940 | Seter | 135—1 R |
| 2,866,208 | 12/1958 | Vanderminden | 5—111 |
| 3,278,953 | 10/1966 | Willis | 5—113 |
| 3,464,607 | 9/1969 | Grace et al. | 224—9 X |

CASMIR A. NUNBERG, Primary Examiner

U.S. Cl. X.R.

5—111; 135—1; 224—10